US009856719B1

(12) United States Patent
Williams

(10) Patent No.: US 9,856,719 B1
(45) Date of Patent: Jan. 2, 2018

(54) SYSTEM FOR SUPPLYING POWER FROM THE MAIN POWERHOUSE TO A DRILL FLOOR POWERHOUSE

(71) Applicant: Kevin R. Williams, Cypress, TX (US)

(72) Inventor: Kevin R. Williams, Cypress, TX (US)

( * ) Notice: Subject to any disclaimer, the term of this patent is extended or adjusted under 35 U.S.C. 154(b) by 0 days.

(21) Appl. No.: 15/386,855

(22) Filed: Dec. 21, 2016

(51) Int. Cl.
*H02J 1/10* (2006.01)
*E21B 41/00* (2006.01)
*H02J 3/38* (2006.01)
*H02M 7/06* (2006.01)
*E21B 3/02* (2006.01)
*E21B 21/00* (2006.01)
*E21B 19/00* (2006.01)

(52) U.S. Cl.
CPC .............. *E21B 41/00* (2013.01); *H02J 3/381* (2013.01); *H02M 7/06* (2013.01); *E21B 3/02* (2013.01); *E21B 19/008* (2013.01); *E21B 21/00* (2013.01)

(58) Field of Classification Search
CPC ..................................................... E21B 41/00
See application file for complete search history.

(56) References Cited

U.S. PATENT DOCUMENTS

| | | | |
|---|---|---|---|
| 4,272,986 A | 6/1981 | Lowry et al. | |
| 4,279,292 A | 7/1981 | Swiaposz | |
| 4,788,626 A | 11/1988 | Neidig et al. | |
| 5,606,264 A | 2/1997 | Licari et al. | |
| 5,977,621 A | 11/1999 | Stuck | |
| 6,325,142 B1* | 12/2001 | Bosley | E21B 47/0008 166/53 |
| 2004/0159146 A1 | 8/2004 | Belanger | |
| 2008/0203734 A1* | 8/2008 | Grimes | E21B 3/02 290/40 R |
| 2008/0212302 A1 | 9/2008 | Popp et al. | |
| 2011/0115506 A1 | 5/2011 | Eriksson et al. | |

* cited by examiner

*Primary Examiner* — Daniel Cavallari
(74) *Attorney, Agent, or Firm* — Egbert Law Offices, PLLC

(57) ABSTRACT

A system for supplying power for drilling operations has a main powerhouse and a drill floor powerhouse in which the drill floor powerhouse is movable in relation to the main powerhouse. The main powerhouse has an generator/generator, a mud pump, and a mud pump drive thereat. The mud pump drive is supplied with power from the engine/generator. The drill floor powerhouse as an energy storage system connected or interconnected to an output line from the engine/generator such that power from the engine/generator is directed to the energy storage system. The drill floor powerhouse has a load connected to the energy storage system such that power from the energy storage system is directly transferred to the load and such that power from the engine/generator is isolated from the load.

12 Claims, 4 Drawing Sheets

SYSTEM FOR SUPPLYING POWER FROM THE MAIN POWERHOUSE TO A DRILL FLOOR POWERHOUSE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to supplying power for drilling operations. More particularly, the present invention relates to systems whereby power from a main powerhouse is supplied to a remotely located drill floor powerhouse. More particularly, the present invention relates to energy storage systems that can be used for drilling operations.

2. Description of Related Art Including Information Disclosed Under 37 CFR 1.97 and 37 CFR 1.98

In the field of oil well drilling, a significant amount of power is required during the drilling activity. The power requirements, as used on a drilling rig, serve to supply the drawworks, the mud pumps, the top drives, the rotary tables, the dynamic braking systems and other peripheral loads. In oil well drilling activities, oversized power systems are often utilized so as to meet the "peak" power requirements.

Historically, the number of engines/generators that are used and are typically online are more than the required load of the application due to the redundancy and necessary peak KW and VAR demand during certain aspects of the operation. In particular, these peak demands are during the "tripping" of the pipe or drill stem.

During normal operations, there is a base load of lighting, pumps, agitators, mixers, air compressors, etc. This base load can make up typical loads of 400-600 kilowatts. The mud pumps, top drives and rotary tables contribute another fairly consistent KW demand. This demand will vary based on the particular well, depth of drilling, and material being drilled.

During oil well drilling activities, the most intermittent load is the drawworks. This intermittent load is directed toward the peak demand during the raising or lowering of the drill pipe upwardly and downwardly in the well. This peak demand can have loads as much as two to three times the base loads of the other demands on the drilling rig.

When drilling and at times when the downhole tool has to be inspected or changed, it is required to pull all of the drill pipe from the hole. This distance can be 10,000 feet or more. The drill pipe must be taken apart and stacked as it is being removed. After repair or replacement, the reverse procedure must take place so as to reinsert all the components back to the desired depth. During the tripping in or out of the hole, the driller (operator) demands extreme power consumption and very quick bursts as the driller raises (or lowers) the string of drill pipe. Since there is a limitation on the height of the drilling mast, the operator must lift the sections in increments and unscrew the different sections. These sections are stacked one at a time. This process is repeated during the reinsertion of the drill pipe back into the hole. This process is referred to as "making a trip". The intermittent high demand occurs when this load (300,000 pounds or more) occurs over and over again. The load is inconsistent since the weight of the drill stem becomes less and less as sections are removed. The base load requirements for the drilling rig are approximately 600 to 800 KW. The peak demand can be 1.5 MW and as high as 2.0 MW. Because of these power requirements, the emissions of the engines/generators for a typical land rig are quite high. Newer engines can have much lower NOx output than earlier engines. There are also large amounts of carbon dioxide emissions. The fuel consumption during these intermittent demands can be quite significant.

On mechanical rigs, power from the engines drives the rig equipment either directly, through a clutch, or through a torque converter. Electric rigs use engine power to drive one or more generators. The generated electricity is then used to operate motors for the larger equipment on the rig. There are three types of electric rigs, direct current, silicon-controlled rectifiers, and variable frequency drives. Direct current rigs have a DC generator that supplies power to DC motors. These are the oldest types of drive systems. The silicon-controlled rectifier systems produce AC power from the generators and then changed to DC by switchgear in order to power DC motors. This allows for more power to be generated by smaller generators. Variable frequency drives are the newest kind of rig which utilize variable speed AC motors so as to allow for even more power output for the same sized equipment.

There are various ignition methods that are used in the reciprocating internal compression engines used as the generator for electric drilling rigs. These ignition methods include compression ignition and spark ignition. Diesel engines are one type of compression ignition engine. Combustion air is first compression heated in the cylinder and diesel fuel oil is then injected into the hot air. Ignition is spontaneous because the air temperature is above the autoignition temperature of the fuel. Spark ignition initiates combustion by the spark of an electrical discharge. This engine is a dedicated natural gas engine and offers the greatest fuel cost savings and emission reductions in comparison to diesel engines.

Although all diesel-fueled engines are compression-ignited and all gas-fueled engines are spark-ignited, natural gas can be used in a compression ignition engine if a small amount of diesel fuel is injected into the compressed natural gas/air mixture so as to burn any mixture ratio of natural gas and diesel oil. This type of engine is often referred to as a "dual fuel" engine. Compression ignition engines usually operate at a higher compression ratio (ratio of cylinder volume when the piston is at the bottom of its stroke to the volume when it is at the top) than spark ignition engines because fuel is not present during compression. Hence there is no danger of premature autoignition. Since engine thermal efficiency rises with increasing pressure ratio (and pressure ratio varies directly with compression ratio), compression ignition engines are more efficient than spark ignition engines. This increased efficiency is gained at the expense of poorer response to load changes and the need for a heavier structure to withstand the higher pressures.

Natural gas generators are being used for land-based drilling applications and offer unique advantages in reduced exhaust emissions and significant fuel cost savings compared to more commonly-used diesel engine generators. Natural gas engine generators make it simpler to meet ever more stringent emissions regulations, particularly for oxides of nitrogen (NOx). Additionally, natural gas engine generators have the added advantage of accepting wellhead gas for further cost benefits. Diesel engines have much better load characteristics when compared to natural gas engines and therefore respond more reliably to changes in loads as drilling functions abruptly demand power requirements, such as tripping of the drill string.

The dual fuel engine is a compression ignition engine that operates on gaseous fuels while maintaining some liquid fuel injection to provide a deliberate source for ignition. Such a system is usually designed to minimize use of diesel fuel by replacing it with various gaseous fuels and their mixtures while maintaining satisfactory engine performance. Dual fuel engines offer reduced fuel costs and emissions benefits compared to conventional diesels. However, this benefit can be limited since the generator must occasionally switch from higher volume ratios of natural gas back to higher volume ratios of diesel fuel to meet the block loading and load-shedding conditions forced by changing rig power demands.

A new system for drilling operations is shown in FIGS. 1 and 2. This new system is based upon the principle that several wells are drilled near each other into a reservoir. The wells are drilled in rapid succession in a given area. So as to facilitate this ability to drill multiple wells, and to reduce the requirements for moving the drilling equipment, the new system locates a main powerhouse in a fixed location and the drilling floor powerhouse in a remote location such that the drilling floor powerhouse can move for the purpose of drilling new wells. As such, the heavy equipment associated with the engine/generators, the mud pump drives, and the mud pumps is maintained in a fixed location at the main powerhouse. The movable equipment, such as the top drive and drawworks, is placed in the drill floor powerhouse. An umbilical will extend from the main powerhouse to the drill floor powerhouse so as to supply energy from the main powerhouse to the top drive and drawworks at the drill floor powerhouse. The umbilical can provide either AC or DC power to the drill floor powerhouse. FIG. 1 shows a diagrammatic illustration of the new generation of the drilling system 10. The drilling system 10 has a main powerhouse 12 and a drill floor powerhouse 14. An engine/generator bank 16 is located at the main powerhouse 12. The engine/generator bank 16 includes generators 18, 20, 22 and 24 that feed power into an AC bus line 26. In particular, the power that is fed is 600 $V_{ac}$, three-phase at 60 Hz. The AC bus 26 can be connected to a main control center 28 so as to supply power to auxiliary systems 30. A plurality of mud pump rectifiers 32 are connected to the AC bus 26. The mud pump rectifiers 32 convert the 600 $V_{ac}$ power to DC power. In particular, 810 V of DC power are supplied from the mud pump rectifiers 32 to the DC bus 34. Mud pump drives 36 are connected to the DC bus 34. The mud pump drives 36 respectively drive a plurality of mud pumps 38.

The AC bus 26 will be connected to an AC umbilical 40 that extends from the main powerhouse 12 to the drill floor powerhouse 14. Once again, this AC umbilical will transmit 600 $V_{ac}$ power, three-phase and 60 Hz of power to the drill floor powerhouse. The umbilical 40 will connect to a power line 42 in the drill floor powerhouse. Line 42 connects to rectifier 44. Rectifier 44 will convert the AC power to DC power and deliver the DC power along DC bus 46. A plurality of top drives 48 are connected to the DC bus 46. A top drive 48 is connected to the DC bus 46. Also, drawworks 50 and 52 are connected to the DC bus 46. The top drive is connected to the top drive system 54. Drawwork drives 50 and 52 are connected, respectively, the drawworks 56 and 58. A braking chopper 60 is also connected to the DC bus 46. The braking chopper 60 is, in turn, connected to a braking resistor 62. The braking resistor 62 will dissipate power in the form of heat caused by the lowering of the drawworks.

FIG. 2 shows another type of system used for drilling operations 64. In this system, the generator bank 66 is connected to the AC bus 68 in the manner described herein previously. The rectifier bank 70 converts the AC power to DC power. As such, 810 V of DC pass along DC bus 72. A plurality of mud pump drives 74 are driven by the power from bus 72. Braking choppers 76 and 78 are connected to DC bus 72. The braking choppers 76 and 78 are respectively, connected to braking resistors 80 and 82. A DC umbilical 84 extends from the DC bus 72 to the drill floor powerhouse 86. As such, DC umbilical 84 connects the main powerhouse 88 to the drill floor powerhouse 86. The DC umbilical serves to provide power to the top drive 90 and to the drawworks 92 and 94. Heat from the lowering of pipe by way of the drawworks is then transmitted back to the braking chopper 76 and 78 and, in turn, to the braking resistors. Once again, in the system, the energy from the lowering of the drill pipe is dissipated into the environment as heat, rather than recovered as energy.

A problem with the system shown in FIGS. 1 and 2 is that is necessary to maintain an excessive number of engine/generators online to sustain the very high transient loads as the drawworks accelerates rapidly to and from maximum speed during drill pipe tripping operations. This can be a particular problem with natural gas-powered engines. The very large braking resistors are required to dissipate the large regenerated energies created by the drawworks during repeated decelerations. As a result, this causes an increased fuel consumption. The high intermittent power to and from the drawworks during the tripping operations significantly increases the average current flow in either the AC umbilical or the DC umbilical. This means that the cable is made up of several parallel lengths of high current cable. Since these long cables need to be disconnected, spooled and shipped each time the rig moves, this is a significant operational difficulty. As such, a need has developed so as to be able to reduce the power requirements during the drilling operations at the drill floor powerhouse and, as such, reduce the size and capacity of the umbilical used to transfer power from the main powerhouse to the drill floor powerhouse.

In the past, the present inventor has several patents relating to energy storage devices in which the power for the top drive and the drawworks is provided directly from an energy storage system rather than directly from the engine/generators. In each of these prior art patents, power is first delivered from the engine/generators to the energy storage system. Subsequently, energy from the storage system is used directly by the top drive and drawworks. In particular, U.S. Pat. No. 9,059,587, issued on Jun. 16, 2015 to the present inventor, describes a system and method of supplying power to loads of a drilling rig. This system has a natural gas engine/generator and an energy storage system. The load is switchably connected to one or both of the natural gas engine/generator and the energy storage system. The natural gas engine/generator and the energy storage system have a capacity suitable for supplying requisite power to the load. A rectifier is connected to an output of the engine/generator so as to convert the AC power to DC power. The rectifier is a phase-controlled silicon-controlled rectifier so as to be responsive to power requirements of the load.

U.S. Pat. No. 9,065,300, issued on Jun. 23, 2013 to the present inventor, teaches a dual fuel system and method of supplying power to loads of a drilling rig. This system has a dual fuel engine/generator and an energy storage system. The load is switchably connected to one or both of the dual fuel engine/generator and the energy storage system. The dual fuel engine/generator and the energy storage system have a capacity suitable for supplying requisite power to the load. A rectifier is connected to an output of the engine/ generator so as to convert the AC power to DC power. The energy storage system is a battery. The dual fuel engine/ generator can either be a dedicated dual fuel system or a fumigation system.

U.S. Pat. No. 9,197,071, issued on Nov. 24, 2015 to the present inventor, shows another energy storage system for supplying power to the loads of a drilling rig. This system has an engine/generator with an output line so as to transfer power therefrom, and energy storage system connected to the engine/generator, and a load connected to the energy storage system such that power from the engine storage system is directly transferred to the load and such the power from the engine/generator is electrically connected to the load. The engine/generator has a capacity greater than a maximum power requirement of the load. The energy storage system can include at least one battery.

In the past, various patents and patent publications have been issued relating to power usage in the control of such power usage by drilling rig systems.

For example, U.S. Pat. No. 4,590,416, issued on May 20, 1986, to Porche et al., teaches a closed loop power factor control for power supply systems. This power factor controller for alternating current/direct current drilling rigs. The power factor controller utilizes a uniquely controlled, unloaded, over-excited generator to reactive power to maintain the rig's power factor within prescribed limits during peak demand operations. In particular, this method includes the step of: (1) sensing the instantaneous system power factors; (2) comparing the sensed instantaneous power factor to a prescribed power factor; (3) forming a power factor control signal indicative of the difference between the sensed power factor and the prescribed power factor; (4) providing a field excitation signal to an unloaded over-excited generator operated in the motor mode in proportion to the power factor control signal so as to cause the over-excited generator to generate the requisite reactive power to correct the system's power factor to the prescribed power factor; and (5) coupling the output of the over-excited generator to the power system.

U.S. Patent Publication No. 20088/0203734, published on Aug. 28, 2008 to Grimes et al., describes a wellbore rig generator engine power control system. This system controls power load to a rig engine. This system includes a sensor for controlling a rig engine and a sensor for sensing the exhaust temperature of a rig engine. The sensor is in communication with the controller so as so as to provide the controller with signals indicative of the exhaust temperature. The controller maintains power load to the rig engine based on the exhaust temperature.

U.S. Patent Publication No. 2009/0195074, published on Aug. 6, 2009 to Buiel, shows an energy supply and storage system for use in combination with a rig power supply system. This system includes a generator start/stop and a power output control. A bi-directional AC/DC converter converts the AC power generated by the engine-generator. The power supply is adapted to draw energy from the storage system when the rig motor exceeds the capacity of the generator.

U.S. Patent Publication No. 2009/0312885, published on Dec. 17, 2009 to Buiel, teaches a management system for drilling rig power supply and storage. This management system has a power generator coupled to rig loads. The power generator is used for powering and charging the storage system. The energy storage system draws energy from the storage system in periods of high power requirements and distributes excess energy to the storage system in periods of lower power requirements. The output of the power generator is managed based on the rig power usage wherein the output is increased when the rig power requirements are above a preselected threshold and wherein the output is decreased when the rig power requirements fall below a preselected threshold.

One of the problems of the Buiel applications is that the power generator supplements and complements the power requirements of the load in order to satisfy the rig power demand. As such, when rig power demand is high, the generators will operate with relatively high dynamic loads. The operation of the engine/generator can vary significantly between low operating requirements and high operating requirements. As such, the generators are unable to achieve a near steady-state power output level. This reduces the fuel efficiency and economy, and increases the emissions from such generators. As such, the Buiel publications fail to allow the engine/generator to operate in a generally steady-state power output level.

U.S. Patent Publication No. 2011/0074165, published on Mar. 31, 2011 to Grimes et al., describes a system for controlling power load to a rig engine of a wellbore rig. The system includes a controller for controlling the rig engine and a sensor for sensing the exhaust temperature of the rig engine. The sensor is in communication with the controller for providing to the controller signals indicative of the exhaust temperature. The controller maintains the power load to the rig engine based on the exhaust temperature.

The Grimes publication also uses the engine/generator to complement or supplement the load requirements. As such, when the battery levels are low, additional power is transferred directly from the engine/generator to the load. The engine/generator will have to respond to high dynamic loads and low dynamic loads. As such, the engine/generator will be unable to operate in near steady-state conditions. This creates inefficiencies and unreliability. It also reduces fuel economy and increases emissions.

U.S. Pat. No. 7,311,248, issued on Dec. 15, 2009 to the present inventor, provides a system for managing energy consumption in a heave-compensating drawworks. This system includes a power supply, a winch drum connected to the power supply so as to receive power from the power supply, a flywheel connected to the winch drum and to the power supply, and a controller connected to the power supply and to the winch drum for passing energy to and from the flywheel during an operation of the winch drum. The flywheel includes a disk rotatably coupled to an AC motor. This power supply includes a first pair of AC motors operatively connected on one side of the winch drum and a second pair of AC motors operatively connected on an opposite side of the winch drum.

It is an object of the present invention to provide a drilling system that reduces the size of the umbilical between a main powerhouse and a drill floor powerhouse of the drilling system.

It is another object of the present invention to provide a drilling system which reduces the number of on-line generators.

It is another object of the present invention to provide a drilling system that reduces the need for resistor banks.

It is another object of the present invention to provide a drilling system that reduces the total power required by the system.

It is still another object of the present invention provide a drilling system that reduces fuel consumption.

It is a further object of the present invention to provide a drilling system which reduces the time, effort and expense associated with the connection of a main powerhouse to a drilling floor powerhouse.

It is another object of the present invention to provide a drilling system where in the power to the load of the drilling rig floor powerhouse is provided substantially entirely by an energy storage system.

It is another object of the present invention to provide a drilling system which allows the engine/generator is to operate under steady-state conditions.

It is still another object of the present invention to provide a drilling system which reduces fuel consumption and reduces emissions.

It is still a further object of the present invention to provide a drilling system which enhances the reliability of the operation of the engine/generators.

These and other objects and advantages of the present invention will become apparent from a reading of the attached specification and appended claims.

BRIEF SUMMARY OF THE INVENTION

The present invention is a system for supplying power for drilling operations which comprises a main powerhouse and a drill floor powerhouse in spaced relation to the main powerhouse. The main powerhouse has an engine/generator, a mud pump and a mud pump drive thereat. The mud pump is driven by the mud pump drive. The mud pump drive is supplied with power from the engine/generator. The engine/generator has an output line extending therefrom. The drill floor powerhouse has an energy storage system connected or interconnected to the output line from the engine/generator such that power from the engine/generator is directed to the energy storage system. The drill floor powerhouse has a load connected to the energy storage system such that power from the energy storage system is directly transferred to the load such that power from the engine/generator can be isolated from the load. The engine/generator has a capacity greater than an average power requirement of the load.

In the present invention, the load includes a top drive and a drawworks that are positioned that the drill floor powerhouse. In one embodiment of the present invention, the output line is in an AC umbilical. When the output line is an AC umbilical, a rectifier is positioned at the drill floor powerhouse and connected to the AC umbilical. The rectifier converts AC power from the engine/generator into DC power to the energy storage system. The AC umbilical has a capacity less than a maximum power requirement of the load. The energy storage system has a capacity greater than the maximum power requirement of the load.

In an alternative embodiment, the output line is a DC umbilical. When a DC umbilical is used, a rectifier is positioned at the main powerhouse. The rectifier is connected to the engine/generator so as to convert AC power from the engine/generator into DC power. A DC bus is connected to the mud pump drive. The output line is connected to the DC bus.

The energy storage system can be either a battery, a capacitor, or a flywheel. In particular, the main powerhouse has a plurality of engine/generators, a plurality of mud pumps, and a plurality of mud pump drives thereat. The main powerhouse is in spaced relation to the drill floor powerhouse. The drill floor powerhouse is movable relative to the fixed location of the main powerhouse.

This foregoing Section is intended to describe, with particularity, the preferred embodiments of the present invention. It is understood that modifications to these preferred embodiments can be made within the scope of the present claims. As such, the Section should not be construed, in any way, as limiting of the broad scope of the present invention. The present invention should only be limited by the following claims and their legal equivalents.

DETAILED DESCRIPTION OF THE INVENTION

Figure 1:
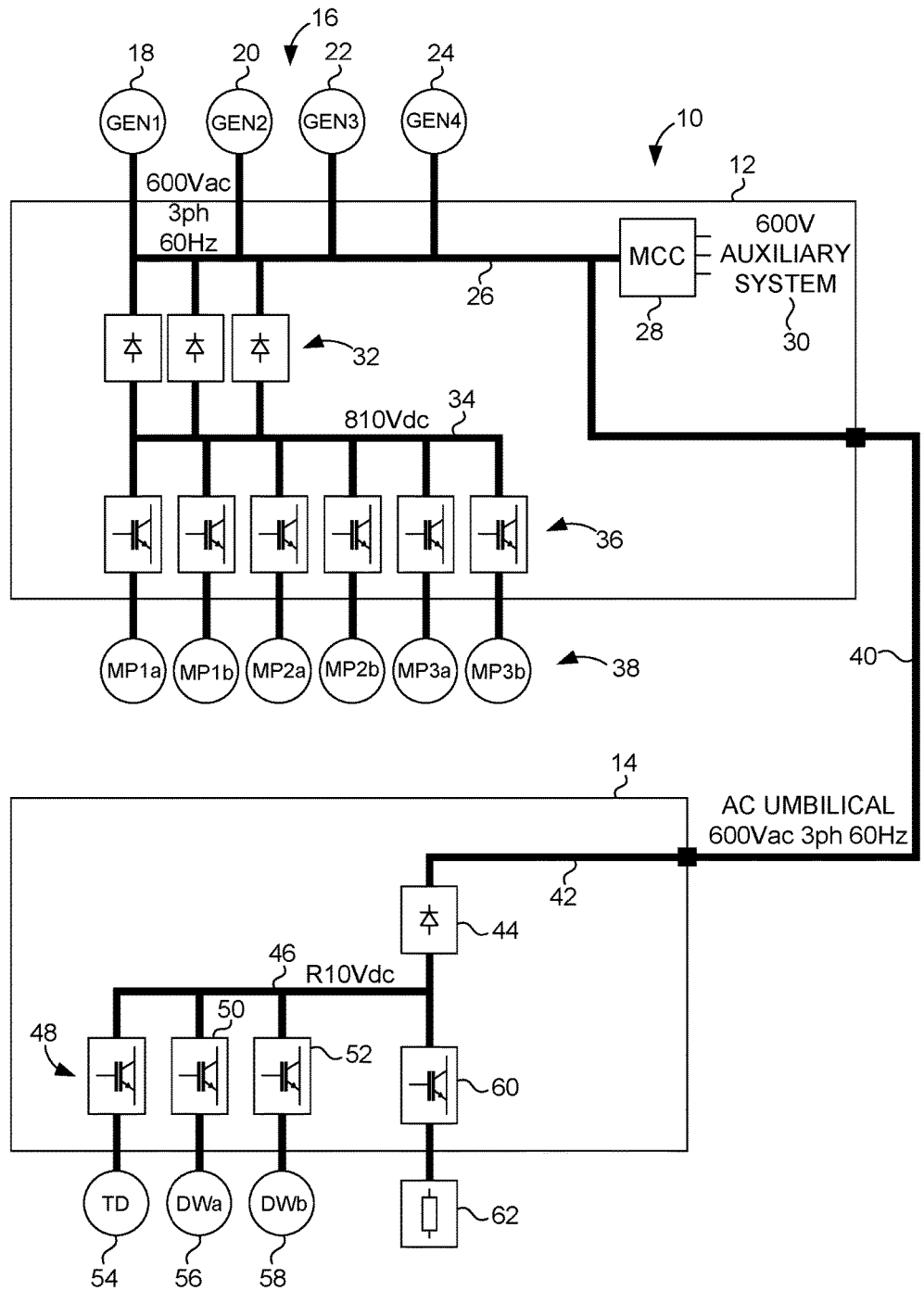
FIG. 1 is a diagrammatic illustration of a prior art power supplying system using an AC umbilical of the prior art.
Figure 2:
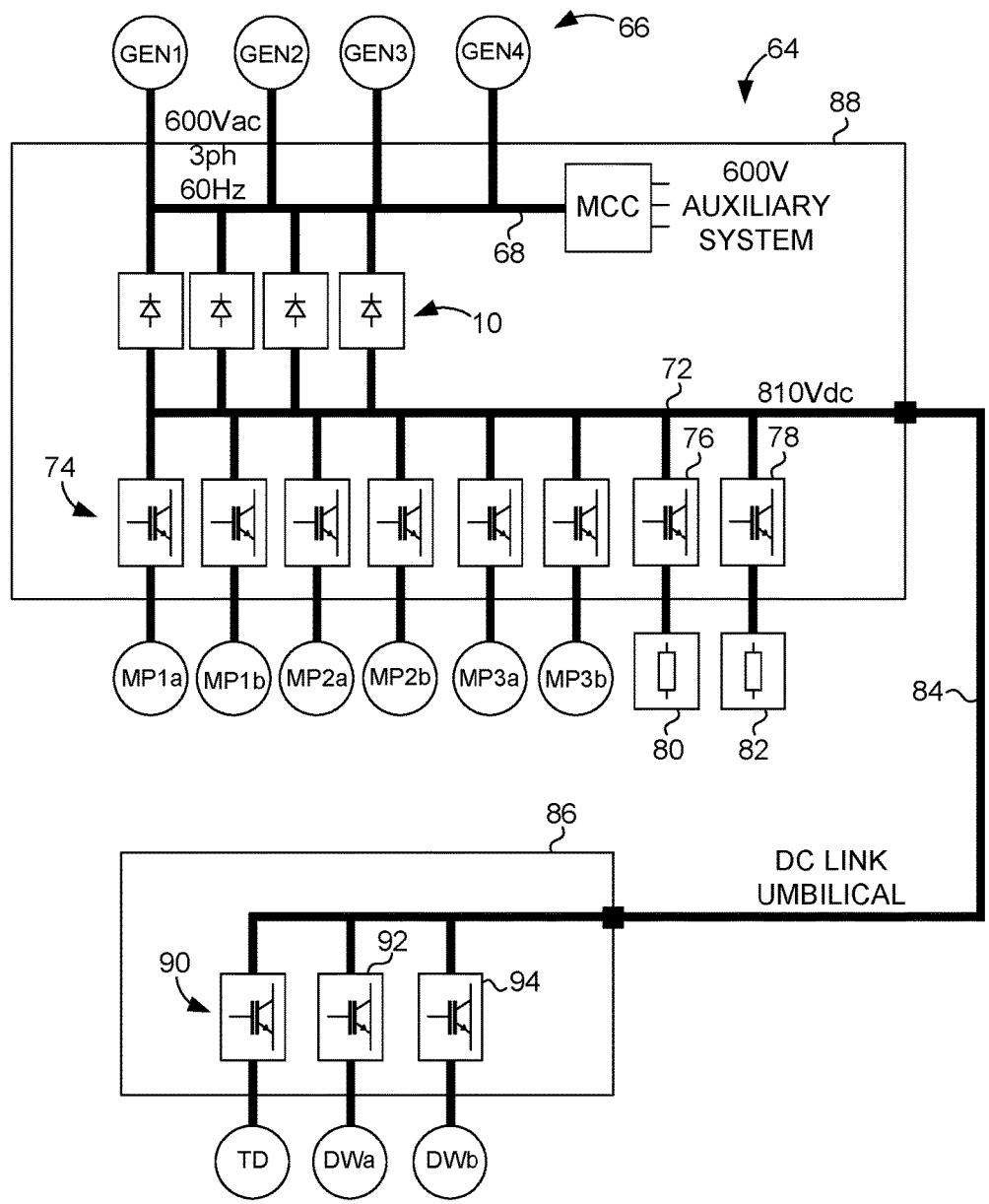
FIG. 2 is a diagrammatic illustration of a power supplying system of the prior art using a DC umbilical.
Figure 3:
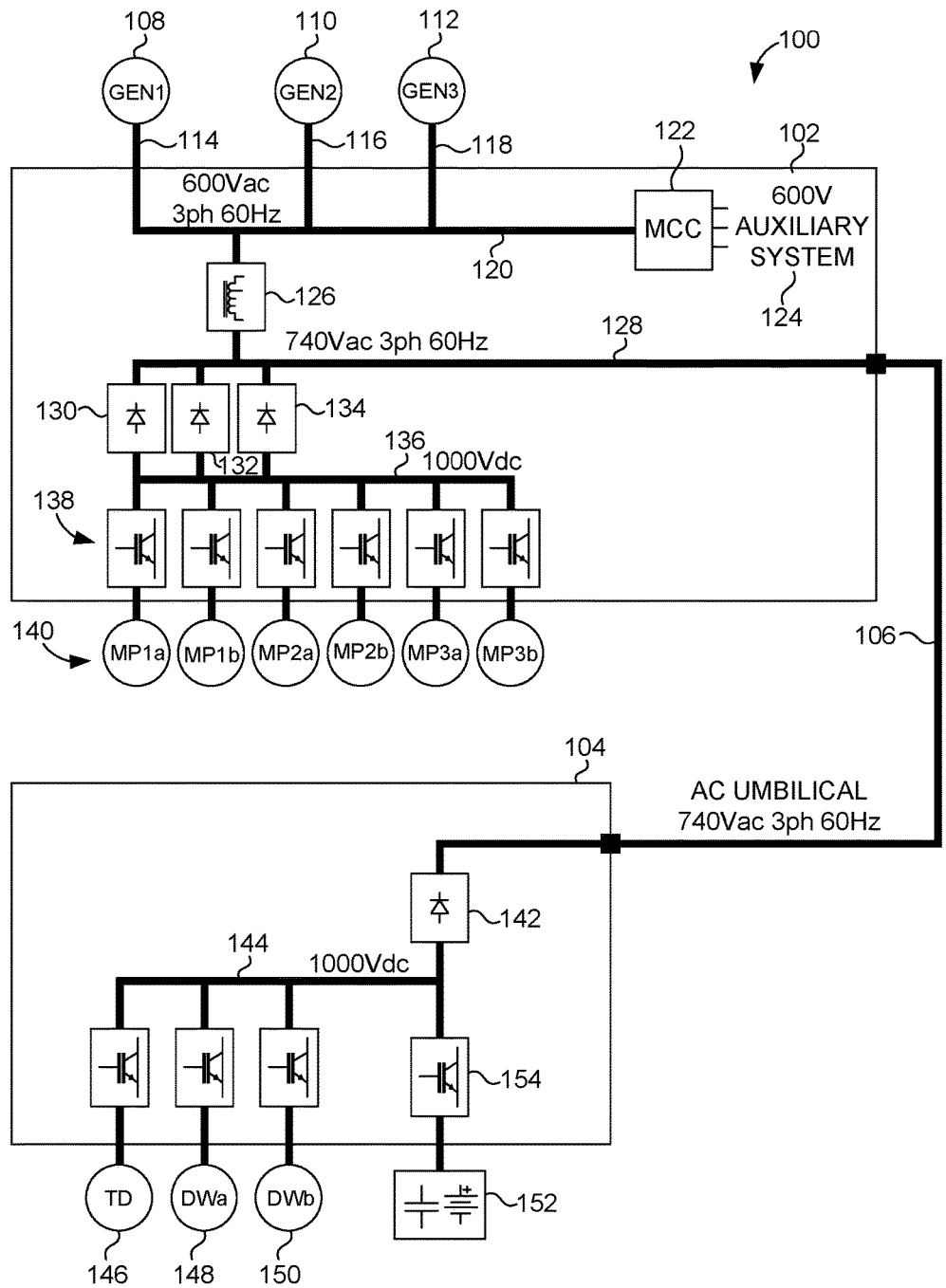
FIG. 3 is a diagrammatic illustration of the power supply system of the present invention using an AC umbilical.

FIG. 3 shows one embodiment of the power supply system 100 of the present invention. The power supply system 100 includes a main powerhouse 102 and a drill floor powerhouse 104. An AC umbilical 106 serves to transfer power from the main powerhouse 102 to the drill floor powerhouse 104.

The main powerhouse 102 has generators 108, 110 and 112 for generating AC power. The generators 108, 110 and 112 can be gasoline-driven internal combustion engines, natural gas generators, or dual fuel systems. The engine/generators 108, 110 and 112 are connected by respective lines 114, 116, and 118 to an AC bus 120. The AC bus 120 carries 600 V, three-phase, and 60 Hz of AC power. This power can be delivered to a man control center 122 that serves to deliver power to the auxiliary systems 124 associated with the drilling operations.

In FIG. 3, an auto-transformer 126 is connected to the AC bus 120. This auto-transformer 126 can increase the voltage from 800 V to 1000 V. 1000 V is the highest value for a "low-voltage system". This voltage will provide the maximum power per amp. This type of low-voltage system will provide the drive systems with a wider power range so as to allow them to run faster. The auto-transformer 126 is connected to AC bus 128. AC bus 128 will pass 740 V, three-phase, and 60 Hz of AC power if the auto transformer 126 is used. Mud pump rectifiers 130, 132 and 134 are connected to the AC bus 128. Rectifiers 130, 132 and 134 will convert the AC power to DC power and deliver the power to DC bus 136. This DC bus will then carry 1000 V of DC power. A mud pump drive bank 138 is connected to respective mud pumps 140. The DC power from bus 138 will effectively drive the mud pumps 140 by way of the mud pump drives 138.

The AC umbilical 106 is connected to the AC bus 128. As such, the 740 V, three-phase, and 60 Hz power as produced from the auto-transformer is delivered to the drill floor powerhouse 104. This power will pass into rectifier 142 and then be delivered as 1000 V of DC power along DC bus 144. DC bus 144 will serve to power the top drive 146 and the drawworks 148 and 150.

Importantly, an energy storage device 152 is connected to an energy storage charge/discharge component 154. As such, as power is generated as a result of the acceleration of the drill pipe from the drawworks 148 and 150, this power can be delivered back to the energy storage system 152. Preferably, the energy storage system supplies all of the power as required by the top drive 146 and the drawworks 148 and 150. The engine/generators 108, 110 and 112 will continuously charge the energy storage system 152 during the operations of the top drive 146 and the drawworks 148 and 150. As such, power from the engine/generators 108, 110 112 is isolated from the top drive 146 and the drawworks 148 and 150. The energy storage system 152 can be a battery bank, a capacitor, or a flywheel system.

Figure 4:
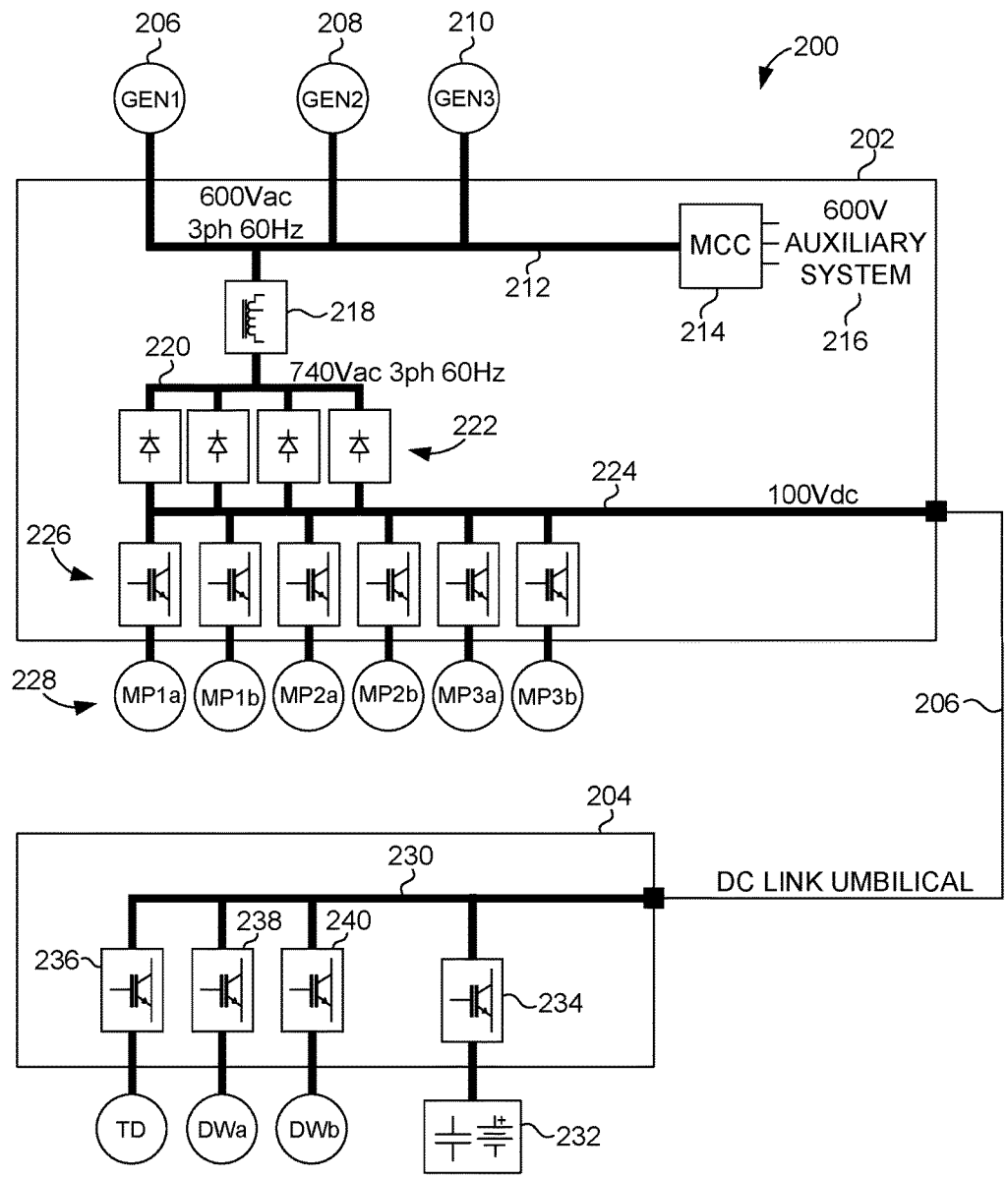
FIG. 4 is a diagrammatic illustration of the power supply system of the present invention utilizing a DC umbilical.

FIG. 4 shows an alternative power supply system 200 in accordance with the present invention. The power supply system 200 has a main powerhouse 202 and a drill floor powerhouse 204. A DC umbilical 206 connects the main powerhouse 202 to the drill floor powerhouse 204.

The main power house 202 has engine/generators 206, 208 and 210 connected to a DC bus 212. DC bus 212 is connected to a main control center 214 so as to supply power to auxiliary systems 216. And autotransformer 218, as described hereinbefore, serves to increase the voltage to an AC bus 220. DC bus 220 is connected to rectifier bank 222 which converts the AC power to DC power. As such, DC power will flow along DC bus 224. The mud pump drive bank 226 serves to drive the mud pump bank 228 by way of the DC power 224.

The DC bus 224 is connected to the DC umbilical 206. DC umbilical 206 is connected to a DC bus 230 within the drill floor powerhouse 204. As such, the energy storage system 232 and the energy storage charger/discharger 234 can receive direct DC power from the DC umbilical 206. The DC power is delivered by bus 232 to the top drive 236 into the drawworks 238 and 240.

The energy storage system in either FIG. 3 or 4 absorbs the peak power flow from the drawworks (both positive and negative power flows). As such, it is able to achieve peak shaving. As such, the umbilical is significantly reduced in rating. As such, the size, weight, and number of cables in the umbilical is reduced. The generator loading is now nearly constant so that the number of online generators can be reduced. Very little total power is regenerated to the system. As such, this reduces or eliminates the need for resistive braking. The use of the auto-transformer allows the current into the umbilical to be reduced further (e.g. during continuous drilling with the top drive). The available power/peak speed range of all the drives in the system is increased. The 1000 V DC power or the 740 V AC power remain within the "low voltage" regulatory framework. This offers numerous logistical advantages compared to the use of a "medium voltage" umbilical between the main powerhouse and the drill floor powerhouse.

Within the concept of the present invention, the system directly connects the engine/generators to the energy storage system. As such, the engine/generators will supply power directly to the energy storage system. Power will flow from the engine/generator to the energy storage system such that the energy storage system is continuously supplied with power. During the supply of power from the energy storage system to the load, the engine/generators are electrically isolated from the load. As such, the power requirements of the load are entirely supplied by the energy storage system. In the event of failure of the energy storage system, the power can be directed from the engine/generator to the load.

In the present invention, the power supplied from the energy storage system is greater than the maximum requirements of the load. As such, during normal operation, it will never be necessary to directly transfer energy from the engine/generators to the load. Since the energy storage system is directly connected to the engine/generators, all of the power requirements for the energy storage system are supplied by the engine/generators. As the batteries discharge to the load, the engine/generators will continuously supply power to the batteries. Suitable control and monitoring equipment can be associated with the energy storage system. When a sufficient amount of power has been discharged from the energy storage system, the engine/generators can be actuated so as to recharge the batteries of the energy storage system. Under these conditions, the engine/generators can operate near a maximum capacity (at least 80% of the rated capacity). As such, the engine/generator sets will be operating at near optimal conditions. This maximizes fuel efficiency and minimizes emissions. It is recognize that engine/generators, when operating at low speeds, actually consume more fuel and create greater emissions. The present invention, by utilizing the energy storage system having a capacity greater than the maximum requirements of the load, avoids the need for the supplementing or complementing the power produced from the energy storage system. Quite clearly, during those times when the energy storage system is fully recharged, the engine/generators can be turned off and, as such, will consume no fuel nor produce any omissions. Typically, in order to maintain the operation of the load, the engine/generator should have a total capacity greater than average power requirement of the load. As such, there would be no possibility of the batteries that the energy storage system has been discharged to the point where the load would not have sufficient power.

The system of the present invention is designed with needed energy and power to satisfy the load of the drilling floor powerhouse. Since the energy storage system has adequate energy capacity and power rating, it can be connected to the respective DC bus so as to stabilize the DC bus against changing power demands as commanded by the various drilling operations associated with the load. The output from the energy storage system directly satisfies the power demand of the drilling rig. The engine/generators are operated to maintain the state-of-charge of the energy storage system.

The energy storage system is continually cycling with bi-directional power flow in response to the power state of the load in order to permit the engine/generators to operate at a near steady-state power output level. The use of the energy storage system provides the ability to operate the engine/generators at a high load point (i.e. above 80%) or to be turned off. During the off condition, the rig power demand is provided solely by the energy storage system.

The use of the energy storage system serves to peak shave rig load so as to permit near steady-state engine generator operation. This leveling-out of the engine generator operation reduces the criticality of genset control for the dynamic engine loading due to the variable methane content.

The foregoing disclosure and description of the invention is illustrative and explanatory thereof. Various changes the details of the illustrated construction can be made within the scope of the present claims without departing from the true spirit of the invention. The present invention should only be limited by the following claims and their legal equivalents.

I claim:

1. A system for supplying power for drilling operations, the system comprising:
   a main powerhouse having an engine/generator, a mud pump and a mud drive thereat, said mud pump being driven by said mud drive, said mud drive being supplied with power from said engine/generator, said engine/generator having an AC umbilical extending therefrom, wherein an autotransformer is connected between said engine/generator and said AC umbilical; and
   a drill floor powerhouse having an energy storage system connected or interconnected to said outlet line from said engine/generator so that power from said engine/generator is directed to said energy storage system, said drill floor powerhouse having a load connected to said energy storage system so that power from said energy storage system is directly transferred to said load, said engine/generator having a capacity greater than an average power requirement of said load, said AC umbilical having a capacity less than a maximum power requirement of said load, said main powerhouse being in spaced relation to said drill floor powerhouse, said drill floor powerhouse being in movable relationship to a fixed location of said main powerhouse.

2. To the system of claim 1, said load being a top drive and a drawworks positioned at said drill floor powerhouse.

3. The system of claim 1, further comprising:
   a rectifier positioned at the drill floor powerhouse and connected to said AC umbilical, said rectifier converting AC power from said engine/generator into DC power to said energy storage system.

4. The system of claim 1, said energy storage system having a capacity greater than a maximum power requirement of said load.

5. The system of claim 1, said outlet line connected to a DC bus, said load connected to said DC bus.

6. The system of claim 1, said energy storage system selected from the group consisting of a battery, a capacitor and a flywheel.

7. A system for supplying power for drilling operations, the system comprising:
   a main powerhouse having an engine/generator, a mud pump, and a mud pump drive thereat, said mud pump being driven by said mud pump drive, said mud pump drive being supplied with power from said engine/generator, said engine/generator having an output line extending therefrom, wherein an autotransformer is connected between said engine/generator and said output line; and
   a drill floor powerhouse having an energy storage system connected or interconnected to said output line from said engine/generator so that power from said engine/generator is directed to said energy storage system, said drill floor powerhouse having a load connected to said energy storage system so that power from said energy storage system is directly transferred to said load, said energy storage system having the capacity greater than a maximum power requirement of said load, wherein said output line has a capacity less than a maximum power requirement of said load.

8. The system of claim 7, said engine/generator having a capacity greater than an average power requirement of said load.

9. The system of claim 7, said load being a top drive and a drawworks positioned at said drill floor powerhouse.

10. The system of claim 7, said output line being an AC umbilical, the system further comprising:
    a rectifier positioned at said drill floor powerhouse and connected to said AC umbilical, said rectifier converting AC power from said engine/generator into DC power to said energy storage system.

11. The system of claim 7, said engine/generator comprising a plurality of engine/generators, said mud pump comprising a plurality of mud pumps, said mud pump drive comprising a plurality of mud pump drives.

12. The system of claim 7, said energy storage system selected from the group consisting of a battery, a capacitor and a flywheel.

* * * * *